July 3, 1934.    H. J. MILLER    1,965,128
IMPLEMENT FOR CLEANING TUBULAR MEMBERS
Filed Dec. 1, 1933
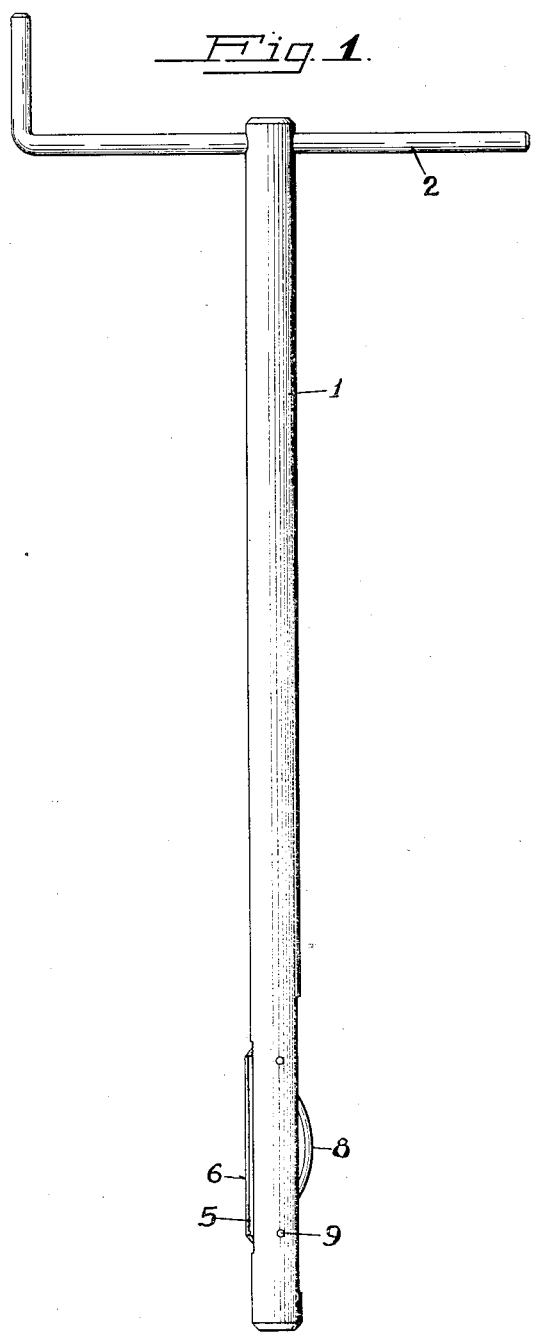
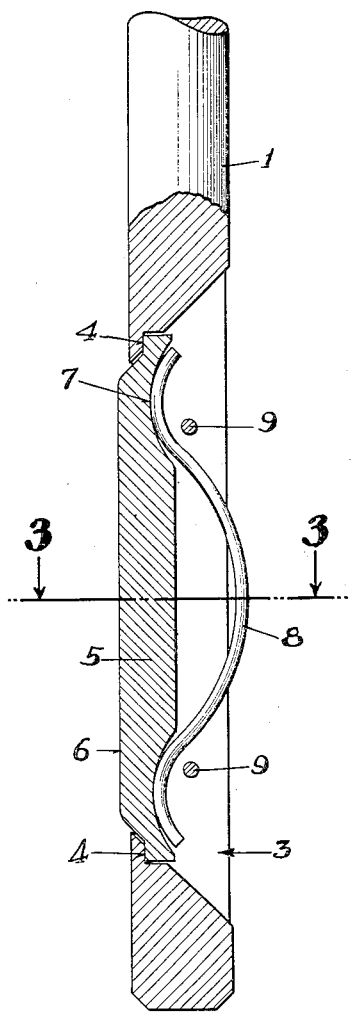
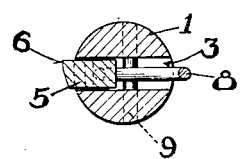
INVENTOR,
Harry J. Miller
BY J. E. Tralucco
ATTORNEY Patented July 3, 1934

1,965,128

UNITED STATES PATENT OFFICE 1,965,128

IMPLEMENT FOR CLEANING TUBULAR MEMBERS

Harry J. Miller, Napa, Calif., assignor of one-half to Hugo A. Zeller, Napa, Calif.

Application December 1, 1933, Serial No. 700,507

6 Claims. (Cl. 15—104.09)

This invention relates to improvements in implements for cleaning tubular members.

An object of my invention is to provide an improved implement for cleaning the inside of valve guides, pipes or other kinds of tubular members upon the walls of which accumulations have collected.

Another object of my invention is to provide an improved tool of novel design and construction, embodying a self-aligning cutting or scraping member which is adapted to automatically engage with the inner surface of a tubular member to be cleaned, at points along its entire cutting edge.

A further object of my invention is to provide an improved tool for cleaning the inside surface of tubular members, which embodies novel means for automatically causing an elongated cutting or scraping member, forming a part of the tool, to firmly engage and become aligned with the inside surface of a tubular member.

Other objects of my invention will present themselves or will be specifically pointed out in the description to follow.

In the accompanying drawing:

Fig. 1 is a side elevation of an implement constructed in accordance with my invention;

Fig. 2 is a side elevation, partly in section, of a part of the implement illustrated in Fig. 1; and Fig. 3 is a sectional view taken along the line 3—3 of Fig. 2.

Referring to the drawing the numeral 1 designates a shank, preferably circular in cross section, provided with a suitable handle 2 at one end. The shank, at points adjacent its other end, is provided with a longitudinally disposed slot 3, the two opposite end walls of which are inclined in opposite directions. The end walls of the slot 3 are preferably notched or otherwise cut away to provide shoulders 4 against which the end portions of an elongated cutting or scraping member 5 normally engages. The cutting member 5 protrudes through the slot 3 and is provided with a longitudinally disposed cutting edge, as at 6, which normally extends beyond and substantially parallel to the side of the shank 1.

The opposite or inwardly disposed side of the cutting member is cut away at points adjacent the ends of the latter to provide curved seats, as at 7, within which the curved end portions of a bow-shaped spring member 8 is located. The spring member is made from steel wire or other suitable material, and is so proportioned and shaped that its central portion protrudes through the slot 3 and extends beyond the side of the shank 1. So as to provide means for maintaining the cutting member 5 and the spring member 8 in operative positions within the slot 3, pins 9 are positioned across the said slot at points between the curved ends of the said spring member and the enlarged side of the said slot. It is contemplated that my improved implement be made in various sizes; and that when a tubular member of a certain diameter is to be cleaned, that an implement of a size adapted to most efficiently operate in the said tube be selected.

When the shank 1 of a properly proportioned implement is inserted in a tubular member to be cleaned, the protruding central part of the spring member 8 engages with the wall of the tubular member and resiliently presses the cutting edge 6 of the cutting member 5 into firm engagement with the said wall. The cutting and spring members being capable of independent movement and self-adjustment within the slot 3, automatically assume a position whereby the cutting edge 6 is aligned against the wall of the tubular member. During the operation of the implement the spring member maintains the cutting member in such a position that the cutting or scraping edge thereof is firmly aligned with the said wall of the tubular member, irrespective of whether or not the shank's position is changed with respect to the center of the tubular member.

Upon turning the handle 2 in the proper direction the cutting edge 6 of the member 5 is actuated against the inside surface of the tubular member, thereby cutting or scraping any foreign accumulations therefrom.

It is apparent to those skilled in the art that my invention is susceptible of numerous modifications and changes in regard to form, shape and minor details of construction. It, therefore, is to be understood that the appended claims are to determine the scope of my invention rather than the exact disclosures herein made.

Having described my invention what I claim is:

1. An implement for cleaning tubular members comprising a shank having a longitudinally disposed slot extending diametrically therethrough, a cutter loosely mounted in the slot having a cutting edge thereon, the said cutting edge being normally disposed externally of the slot, and a spring member mounted in the slot with a certain part thereof in engagement with the cutter and another part thereof extending externally of the slot.

2. An implement for cleaning tubular members comprising a shank having a longitudinally disposed slot extending diametrically therethrough, a longitudinally disposed cutter movably located in the slot with a part thereof normally extending outwardly through one side of the slot to points beyond a side of the shank, and a spring member movably located in the slot with parts thereof engaging with the cutter and another part extending through the opposite side of the said slot to points beyond the opposite side of the shank.

3. An implement for cleaning tubular members comprising a shank having a longitudinally disposed slot extending entirely and diametrically therethrough, a cutter movably located in the slot having a cutting edge thereon which is normally located outside the slot, and a spring member mounted in the slot having parts thereof engaging with the cutter and another part thereof extending externally of the slot, and means for normally maintaining the spring member and cutter inside the slot.

4. An implement for cleaning tubular members comprising a shank having a longitudinally disposed slot, the end walls of the said slot being disposed in oppositely inclined directions, a cutter loosely located in the slot having its ends normally engaging with the end walls of the slot, the said cutter having a longitudinally disposed cutting edge normally located externally of the slot, and a bow-shaped spring member located in the slot having its ends engaging with the cutter at points adjacent opposite ends of the latter, the said spring member having its central part extending through and located externally of the slot.

5. An implement for cleaning tubular members comprising a shank having a longitudinal slot extending entirely therethrough, a cutter movably mounted in the slot of the shank at a side thereof, and spring means located in the slot adapted to press the cutter against the wall of a tubular member within which the device is being operated, the said spring means normally extending beyond the opposite side of the shank and adapted to engage with the wall of the said tubular member.

6. An implement for cleaning tubular members comprising a shank having a longitudinal slot extending transversely therethrough, a cutter movably mounted in the slot with its cutting edge located externally of the slot, and spring means located in the slot in engagement with the cutter for pressing the cutter against the wall of a tubular member within which the device is being operated, the said spring means having a part thereof located externally of the slot, which said part is adapted to engage with the wall of the tubular member.

HARRY J. MILLER.